United States Patent
Forbell (10) Patent No.: US 9,785,136 B2
(45) Date of Patent: Oct. 10, 2017

(54) PCH THERMAL SENSOR DYNAMIC SHUTDOWN

(71) Applicant: Intel Corporation, Santa Clara, CA (US)

(72) Inventor: Craig S. Forbell, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 13/631,985

(22) Filed: Sep. 29, 2012

(65) Prior Publication Data

US 2014/0094933 A1    Apr. 3, 2014

(51) Int. Cl.
    G05B 11/01    (2006.01)
    G05B 19/042   (2006.01)

(52) U.S. Cl.
    CPC .......... *G05B 19/0428* (2013.01); *G05B 2219/24205* (2013.01)

(58) Field of Classification Search
    CPC .......... G05B 19/042; G05B 19/0428; G05B 19/0421; G05B 19/0423; G05B 19/0425; G05B 2219/34306; G05B 2219/34465; G05B 2219/49216; G05B 2219/24205; G05B 19/0429; G08C 2201/50; G06F 1/20; G06F 1/203; G06F 1/206
    USPC .......................................................... 700/12
    See application file for complete search history.

(56) References Cited

U.S. PATENT DOCUMENTS

| 7,957,848 B2 * | 6/2011 | Johns et al. ............. 700/299 |
| 2006/0242447 A1 | 10/2006 | Radhakrishnan et al. |
| 2007/0146924 A1 * | 6/2007 | Nishioka .................... 360/75 |
| 2008/0043556 A1 * | 2/2008 | Nale .......................... 365/212 |
| 2010/0165667 A1 * | 7/2010 | Artusi et al. ............. 363/21.01 |
| 2010/0332799 A1 | 12/2010 | Sonobe |

(Continued)

FOREIGN PATENT DOCUMENTS

| CN | 100576338 C | 12/2009 |
| CN | 102207767 A | 10/2011 |

(Continued)

OTHER PUBLICATIONS

International Search Report and Written Opinion received for PCT Patent Application No. PCT/US2013/048294, mailed Oct. 18, 2013, 10 pages.

(Continued)

*Primary Examiner* — Miranda Huang
*Assistant Examiner* — Sivalingam Sivanesan
(74) *Attorney, Agent, or Firm* — Patent Capital Group (57) ABSTRACT

Particular embodiments described herein provide for a system, such as a computing system, that includes a processor operable to execute instructions associated with the electronic code, a thermal sensor operable to measure a temperature associated with a device, and a controller in communication with the thermal sensor. The controller is configured to receive an activity status associated with the processor, and receiving a temperature output value representative of a measured temperature associated with the device from the thermal sensor. The controller is further configured to provide a disable signal to the thermal sensor based upon the activity status indicating that the processor is in a reduced activity state and that the temperature output value is less than or equal to a predetermined temperature threshold value.

22 Claims, 4 Drawing Sheets

(56) References Cited

U.S. PATENT DOCUMENTS

| | | |
|---|---|---|
| 2011/0169552 A1 | 7/2011 | Jeong |
| 2012/0096288 A1* | 4/2012 | Bates .................. G06F 1/206 713/320 |
| 2012/0102346 A1 | 4/2012 | Haj-Yihia |
| 2012/0224602 A1 | 9/2012 | Crafts et al. |
| 2014/0068291 A1* | 3/2014 | Man et al. .................. 713/320 |

FOREIGN PATENT DOCUMENTS

| | | |
|---|---|---|
| CN | 101517510 A | 3/2013 |
| KR | 10-1996-0015135 A | 5/1996 |
| KR | 10-1038392 B1 | 6/2011 |
| TW | 201415218 A | 4/2014 |
| WO | 2008/003018 A1 | 3/2008 |
| WO | 2014/051802 A1 | 6/2014 |

OTHER PUBLICATIONS

International Preliminary Report on Patentability in PCT/US2013/048294, mailed on Apr. 9, 2015, 9 pages.

Search Report in TW Application No. 102131826, mailed on Jun. 3, 2015, English translation, 1 page.

Office Action and Search Report in CN Application No. 201380016765.8, mailed on May 11, 2016, with English translation, 27 pages.

Office Action in TW Application No. 102131826, mailed on Dec. 23, 2015, English translation, 3 pages.

Second Office Action in CN Application No. 201380016765.8, mailed on Dec. 2, 2016, with English translation, 26 pages.

Decision of Rejection in CN Application No. 201380016765.8, dated May 12, 2017, with English translation, 27 pages.

GPTO Official Communication from DE Application No. DE 112013001356.8, dated Jul. 6, 2017 with no English translation; 6 pages.

* cited by examiner

PCH THERMAL SENSOR DYNAMIC SHUTDOWN

TECHNICAL FIELD

Embodiments described herein generally relate to thermal sensor dynamic shutdown.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to thermal sensor dynamic shutdown. Features such as structure(s), function(s), and/or characteristic(s), for example, are described with reference to one embodiment as a matter of convenience; various embodiments may be implemented with any suitable one or more of the described features.

Traditional designs lack certain capabilities such as the capability to dynamically disable a thermal sensor during a system idle power state. During periods of pervasive system idleness and when the temperature is under a safe threshold, overheating and temperature reporting to software are less of a concern.

Particular embodiments described herein provide for a system, such as a computing system, that includes a processor operable to execute instructions associated with the electronic code, a thermal sensor operable to measure a temperature associated with a device, and a controller in communication with the thermal sensor. The controller is configured to receive an activity status associated with the processor, and receiving a temperature output value representative of a measured temperature associated with the device from the thermal sensor. The controller is further configured to provide a disable signal to the thermal sensor based upon the activity status indicating that the processor is in a reduced activity state and that the temperature output value is less than or equal to a predetermined temperature threshold value.

In more particular embodiments, the controller is further configured to store the temperature output value. In still other particular embodiments, the controller is further configured to receive a request for the temperature output value from a requestor, and provide the stored temperature output value to the requestor.

In other embodiments, the controller is further configured to provide the disable signal to the thermal sensor based upon the system being in a non-active state. In a particular embodiment, the non-active state is an idle state.

In still other particular embodiments, the controller is further configured to provide an enable signal to the thermal sensor based upon the activity status indicating that the processor is in an active state. In still more embodiments, the controller is further configured to provide an enable signal to the thermal sensor based upon an elapsing of a predetermined time period.

In other particular embodiments, the device includes a platform controller hub (PCH). In still another particular embodiment, the processor includes a central processing unit (CPU).

In other particular embodiments, wherein the activity status is received from logic that is not the processor.

Thermal Sensor Dynamic Shutdown

Figure 1:
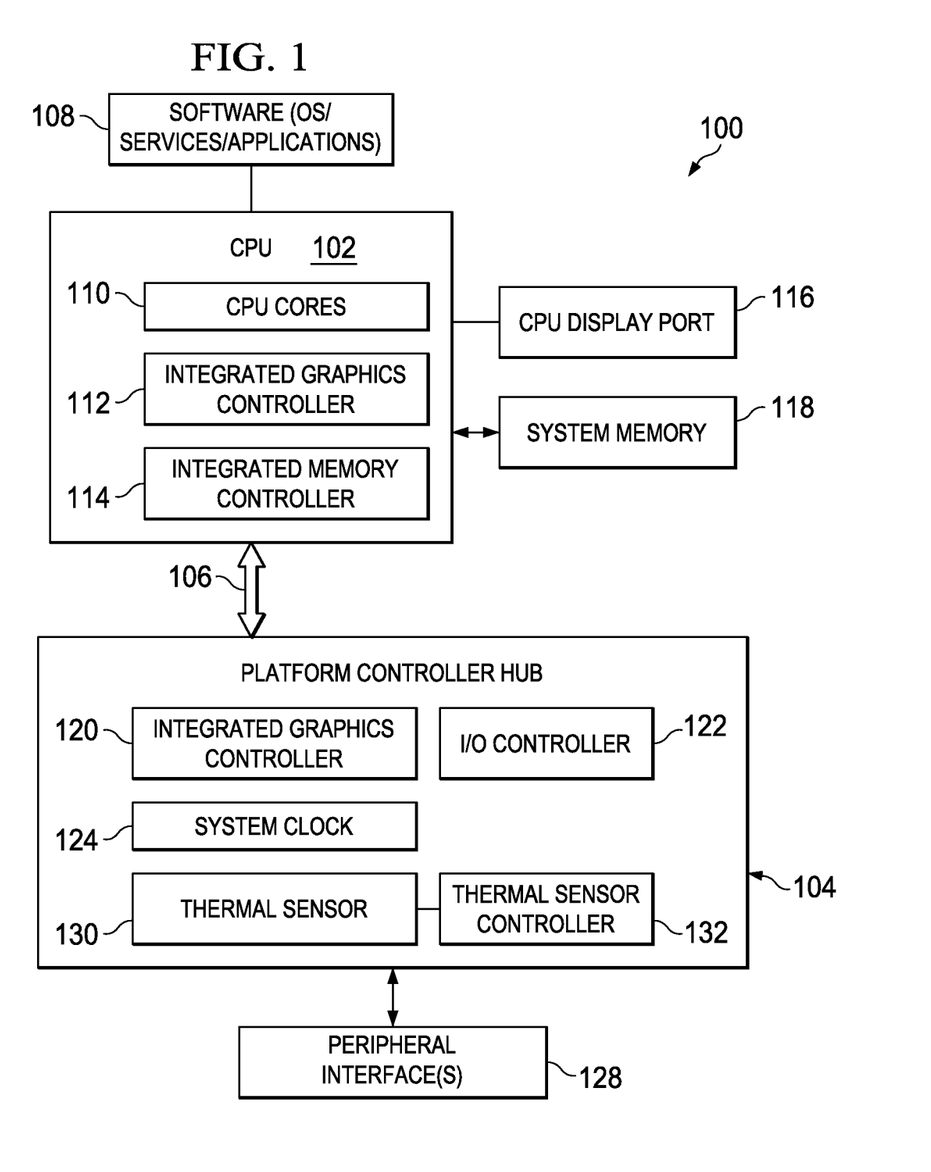
FIG. 1 is a simplified diagram illustrating an embodiment of a computing system including a temperature sensor controller for dynamic shutdown of a temperature sensor configured to measure a temperature associated with one or more devices in accordance with one embodiment of the present disclosure.

Referring now to FIG. 1, FIG. 1 is a simplified diagram illustrating an embodiment of a computing system 100 including a temperature sensor controller for dynamic shutdown of a temperature sensor configured to measure a temperature associated with one or more devices in accordance with one embodiment of the present disclosure. Computer system 100 includes a central processing unit (CPU) 102 and a platform controller hub (PCH) device 104 coupled via one or more communication bus(es) 106. Computer system 100 may include a desktop computer, laptop, netbook, ultrabook, tablet, smartphone, or any other computing device or system. CPU 102 is configured to execute instructions associated with software 108. Software 108 may include an operating system, software services, software applications or any other type of software executable by CPU 102. PCH device 104 is configured to relieve CPU 102 from performing certain functions of computing system 100 such as providing peripheral support and system clocks. Each of CPU 102 and PCH device 104 may be comprised of one or more integrated circuits or chip dies.

CPU 102 includes one or more CPU cores 110, a CPU integrated graphics controller 112, and an integrated memory controller 114. The one or more CPU cores 110 are configured to execute software instructions such as those associated with software 108. CPU integrated graphics controller 112 is configured to provide graphic display capabilities to computer system 100. CPU integrated graphics controller 112 is coupled to a CPU display port interface 116 which may be further coupled to a display device to receive graphic display signals generated by CPU integrated graphics controller 112. Integrated memory controller 114 is coupled to system memory 118 to allow various components of computer system 100 such as CPU 102 to access system memory 118. In at least one embodiment, system memory 108 may be configured to store software instructions, such as software 108, for execution by one or more of CPU cores 110 System memory 118 may be comprised of one or more random access memory (RAM) memory modules. In a particular embodiment, system memory 118 may include double data rate (DDR) memory.

PCH device 104 includes an PCH integrated graphics controller 120, an input/output (I/O) controller 122, and a system clock 124. PCH integrated graphics controller 120 is configured to provide graphic display capabilities to computer system 100. It should be understood that computer system 100 may be configured to use either or both of, CPU integrated graphics controller 112 or PCH integrated graphics controller 120 to provide graphic display capabilities to computer system 100. I/O controller 122 is configured to provide I/O capabilities from PCH device 104 to one or more peripheral interfaces 128 to which one or more peripheral devices may be coupled. Examples or peripheral devices include keyboards, computer mice, storage devices, printers, universal serial bus (USB) devices, wireless local area network (WLAN) devices, local area network (LAN) devices or any other suitable peripheral devices. System clock 124 is configured to provide one or more clock signals to various components of computer system 100.

PCH device 102 further includes a thermal sensor device 130 and a thermal sensor controller 132 coupled thereto. Thermal sensor device 130 is configured to measure a temperature associated with PCH device 102, generate an analog signal representative of the measured temperature, convert the analog signal to a digital signal representative of the temperature, and provide the digital signal to one or more components of computer system 100. In one or more embodiments, thermal sensor 130 measures a die temperature or chip temperature of PCH device 104. In a particular embodiment, thermal sensor device 130 is an on-die thermal sensor positioned close to the hottest on-die location of PCH device 104. In a particular embodiment, thermal sensor 130 is configured to provide a PCH temperature in degrees C. from −50 degrees C. to 130 degrees C. with an accuracy of +/−5 degrees C. in the range of 70-110 degrees C.

Thermal sensor controller 132 is configured to receive the digital signal representative of the measured sensor, and store the digital signal in a temperature register. Thermal sensor controller 132 is further configured to provide the PCH temperature information to one or more components of computer system 100. In a particular embodiment, the PCH temperature information is provided to an external controller (EC) which may be used, for example, to control one or more cooling fans or other devices. In various embodiments, the temperature measured by thermal sensor 130 is used to provide thermal throttling support to computer system 100 by using the PCH temperature to determine what throttle state is needed. Thermal sensor controller 132 is further configured to provide a disable signal to thermal sensor 130 to temporarily shutdown portions of thermal sensor 130 when certain temperature, CPU activity and/or system activity conditions are satisfied as will be further described herein to conserve power consumption within computer system 100. When temperature sensor 130 is in a shutdown condition, the digital signal provided from temperature sensor 130 is no longer a valid and accurate representation of the measure temperature. However, the digital signal value stored within the temperature register of thermal sensor controller 132 remains accessible to other components of computer system 100 while thermal sensor 130 is in the shutdown condition.

During periods of pervasive system idleness and when the temperature is under a safe threshold, overheating and temperature reporting to software are less of a concern. Accordingly, in these circumstances certain portions of temperature sensor 130 may be powered down to save power. For example, analog circuit portions of thermal sensor 130 may consume a large amount of power when operating and it may be desirable to disable these portions under system conditions in which accurate temperature readings are not necessary. In various embodiments, the last reported temperature from thermal sensor 130 is stored within the temperature register of thermal sensor controller 132 and used for reporting to software and/or an external controller. In various embodiments, a hardware timer within thermal sensor controller 132 ensures that thermal sensor 132 is re-enabled within a programmable time period to allow for re-synchronization of the actual temperature measured by thermal sensor 130 to thermal sensor controller 132. Due to the long thermal time constant of the die of PCH device 130, it is not expected under normal conditions to have the temperature rise a substantial amount when in computer system 100 is in certain system power states, such as a an idle system state. However, the hardware timer provides a mechanism to help guarantee maintaining accuracy and thermal management operations within a predetermined time period regardless of system conditions.

Current PCH designs lack certain capabilities such as the capability to dynamically disable a thermal sensor during an S0 system power state. System power states identify the overall power consumption of the system and range from the S0 state in which the system is completely powered ON and fully operational to S5 in which the system is completely powered OFF. States S1-S4 represent various sleep states in which the system appears OFF because of low power consumption but retains enough of the hardware context to return to the working state without a system reboot. Current PCH designs only shut down in Sx states when core power is lost. CPU C-states refer to an activity status of CPU 102. A C0 state indicates an active state in which one or more CPU cores 110 of CPU 102 are executing code. Other non-C0 states refer to CPU states in which CPU 102 is in a non-active state with reduced activity as compared to the C0 state. Current conventional designs leave the thermal sensor always enabled during system S0 states and only shut off the sensor during S3, S4, and S5 states in which power from the platform is shut off. System power levels during the S0 idle state were high enough to justify leaving the thermal sensor enabled in previous conventional designs. However, on next generation systems with the introduction of an always on and connected usage model during S0 idle and expectations of long battery life, the power consumption of the thermal sensor is too high to leave it enabled to meet such requirements. Due to the drive to enable the personal computer as an always on and connected computing device, there is a need to reduce S0 idle power. Various embodiment described herein disable thermal sensor 130 dynamically during the S0 idle state using thermal sensor controller 132.

Various embodiments provide for lower PCH device 104 component power when computer system 100 is in a non-active state. In a particular embodiment, the non active state is the system S0 idle state, otherwise referred to as connected standby or S0ix. PCH device 104 is a component of computer system 100 that consumes a significant percentage of the overall system power in this system state. Currently, there is a drive to enable the PC as an always on and connected device, similar to a smartphone or tablet computer, which requires very low system power consumption in this "connected standby" state. In order to lower the PCH component power to meet long battery life in an always on and connected usage model, certain current consuming circuits should be disabled. Thermal sensor 130, which is used in certain embodiments to measure the die temperature of PCH device 104, is one such current consumer and is not needed when system temperatures are low during pervasively idle states. However, thermal sensor 130 is needed to avoid catastrophic temperature points above a maximum allowable temperature (Tjmax). Typically, there are temperature checkpoints before this catastrophic level which induce throttling to avoid failure. Due to this requirement, previous designs have left the thermal sensor always enabled during system S0 states.

During the system S0 idle state, PCH device 104 still has power and is responsible for detecting system wake events and maintaining system timers. During periods of pervasive system idleness and when the temperature is under a safe threshold, overheating and temperature reporting to software are less of a concern. In various embodiments, thermal sensor 130 is powered down during such conditions.

In accordance with various embodiments, thermal sensor controller 132 uses certain temperature, system and/or CPU conditions to decide when thermal sensor 130 should be disabled. One piece of information that may be used by thermal sensor controller 132 to decide when thermal sensor 130 should be disabled is the CPU C-state. The current CPU C-state can have a large effect on the overall temperature of the platform of computer system 100 as an idle CPU state generates less heat than an active CPU state. Another piece of information that thermal sensor controller 132 may use to determined when thermal sensor 130 should be disabled is the current temperature received by thermal sensor controller 132 from thermal sensor 130. For example, in a particular embodiment if the current temperature is less than a configurable low temperature threshold value (e.g., 50 degrees C.) and the CPU 102 is in an idle C-state, thermal sensor controller 132 may be configured to disable portions of thermal sensor 130. In various embodiments, thermal sensor controller 132 may be configured to re-enable thermal sensor 130 when either the C-state indicates the CPU is active (e.g., C0) or when a hardware re-enable timer expires. In various embodiments, the power up time and re-syncing to actual temperature is fast enough to meet the temperature time constant of the system such as one the order of seconds per degree.

Figure 2:
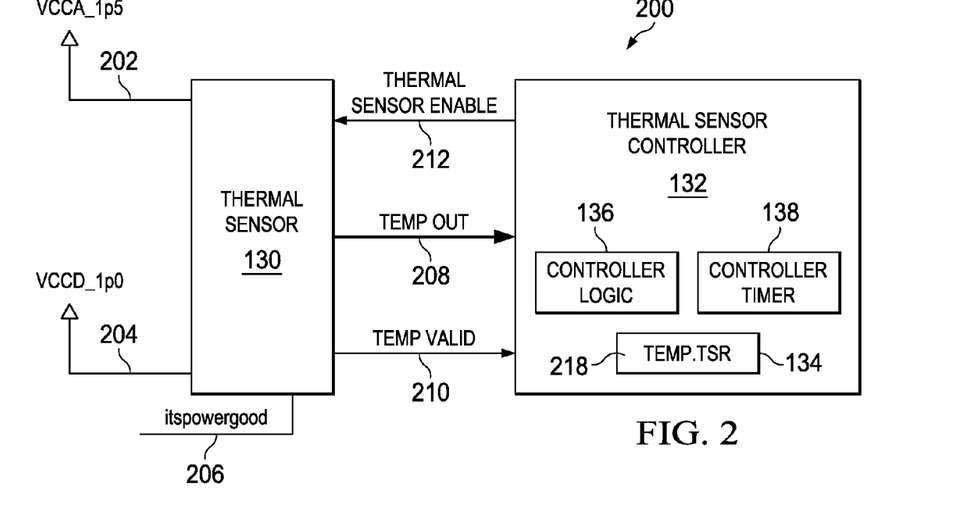
FIG. 2 is a simplified block diagram of a thermal sensor and a thermal sensor controller according to one embodiment.

Referring now to FIG. 2, FIG. 2 is a simplified block diagram 200 of thermal sensor 130 and thermal sensor controller 132 according to one embodiment. In the embodiment of FIG. 2, thermal sensor controller 132 includes temperature register 134, controller logic 136, and a controller timer 138. Temperature register 134 is configured to store the digital value representative of the temperature measured by thermal sensor 130 received by thermal sensor controller 132. Controller logic 136 is configured to implement the operations of thermal sensor controller 132 as described herein. Controller logic 136 may include one or more processors, memory and/or software configured to perform the operations of thermal sensor controller as described herein. Controller timer 138 is configured to generate a shutdown timer signal as further described herein.

Thermal sensor 130 is further configured to receive a first supply rail signal (VCCA_1p5) 202 and a second supply rail signal (VCCD_1p0) 204 to supply power to thermal sensor 130. Thermal sensor 130 is further configured to receive a power good signal (itspowergood) 206 which indicates to thermal sensor 130 whether first supply rail signal (VCCA_1p5) 202 and second supply rail signal (VCCD_1p0) 204 are stable. In a particular embodiment, the value of power good signal (itspowergood) 206 goes high when first supply rail signal (VCCA_1p5) 202 and second supply rail signal (VCCD_1p0) 204 ramp up and become stable. Thermal sensor 130 is further configured to output a reported temperature output value (Temp out) 208 including a digital value representative of the temperature measured by thermal sensor 130 to thermal sensor controller 132. Thermal sensor 130 is further configured to output a temperature valid signal (temp valid) 210 to thermal sensor controller 132 which indicates to thermal sensor controller 132 whether the temperature represented by reported temperature output value (Temp out) 208 is a valid temperature. In a particular embodiment, temperature valid signal (temp valid) 210 is a pulse signal generated by temperature sensor 130. In response to receiving an indication from temperature valid signal (temp valid) 210 that the current reported temperature is valid, thermal sensor controller 132 is configured to store reported temperature output value (Temp out) 208 within temperature register (TEMP.TSR) 134 as a stored temperature value (TEMP.TSR) 218.

Thermal sensor controller 132 is further configured to generate a thermal sensor enable signal (TS enable) 212 indicative of whether portions of thermal sensor 130 are to be in an enabled or disabled state. Thermal sensor controller 132 provides thermal sensor enable signal (TS enable) 212 to thermal sensor 130 and portions of thermal sensor 130 are enabled or disabled accordingly. Thermal sensor controller 132 determines whether the thermal sensor enable signal (TS enable) 212 should indicate whether portions of thermal sensor 130 are to be shutdown.

In various embodiments, a thermal sensor enable signal (TS enable) 212 controls certain analog circuits of thermal sensor 130 although the VCC supplies remain powered. When thermal sensor 130 is disabled, the last reported temperature value from thermal sensor 130 is saved in temperature register 134 such that internal and/or external hardware using this temperature value can continue to use it while thermal sensor 130 is off. However, no updates to temperature register 134 are made during this time. Controller timer 138 functions as a hardware re-enable timer to ensure that thermal sensor 130 is re-enabled within a programmable time period to allow for re-synchronization to the actual die temperature. Although temperatures are not expected to increase during low power system states under normal ambient conditions, this timer covers extreme cases in which a mechanism to periodically update the temperature is needed. One example of this is if a laptop or ultrabook is stored in a car trunk on a very hot summer day. Upon re-enabling thermal sensor 130, another timer is used to count the time needed for thermal sensor 130 to power up and report the current temperature which is indicated by a "temperature valid" indicator pulse of temperature valid signal (temp valid) 210 sent from temperature sensor 130 to thermal sensor controller 132 as will be further described herein.

In various embodiments, controller logic 136 of thermal sensor controller 132 determines when thermal sensor 130 is to be disabled based upon information such as the CPU C-state of CPU 102. The active status of CPU 102 has a large effect on temperature of the platform. Another piece of information that controller logic 136 may use is the last reported temperature. If the last reported temperature is less than a configurable threshold temperature (e.g. 50 degrees C.), and CPU 102 is in a certain C-state (e.g., a non-C0 state), thermal sensor controller 132 may disable thermal sensor 130. Otherwise, thermal sensor controller 132 may leave thermal sensor 130 enabled. If disabled, thermal sensor 130 is re-enabled when either the C-state indicates C0 (CPU is active) or when the re-enable timer expires. In at least one embodiment, thermal sensor controller 132 receives the activity status of CPU 102 from CPU 102. In still other embodiments, thermal sensor controller 132 receives the activity status of CPU 102 from logic, a device, or a component that is not CPU 102. The dynamic thermal sensor shutdown provided for in various embodiments allows PCH device 104 to meet very low power levels during connected standby and other pervasively idle system states.

Thermal Sensor Shutdown Entry

In accordance with at least one embodiment, all of the following conditions need to be met to allow thermal sensor 130 to be shutdown by thermal sensor controller 132:

1) "Dynamic Thermal Sensor Shutdown in S0 idle Enable" configuration bit is set.

2) CPU 102 is in a non-C0 state or "Dynamic Thermal Sensor Shutdown in C0 Allowed" configuration bit is set.

3) The current PCH temperature is less than or equal to a low temperature threshold value.

Regarding condition 1), the "Dynamic Thermal Sensor Shutdown in S0 idle Enable" configuration bit is a software-configurable configuration bit that when enabled allows dynamic shutdown of thermal sensor 130 when the system is in a non-active state such as an idle state. Regarding condition 2), the condition of CPU 102 being in a non-C0 CPU state is satisfied when the CPU 102 is in a non-C0 (non-active or reduced activity) state. In at least one embodiment, the non-C0 state is a non-active state. In a particular embodiment, the non-active state is an idle state. Alternately, condition 2) may be satisfied if the "Dynamic Thermal Sensor Shutdown in C0 Allowed" configuration bit is set which indicates that dynamic shutdown of thermal sensor 130 is allowed even when CPU 102 is in a C0 state (active state). Regarding condition 3), a configurable predefined low temperature threshold value is set by software, or alternately in hardware. When the current stored temperature value (TEMP.TSR) 218 stored in temperature register 134 is less than or equal to the low temperature threshold value, the third condition is satisfied. If the condition 1), condition 2), and condition 3) are satisfied, thermal sensor controller 132 sets the thermal sensor enable signal 212 to disable thermal sensor 120. In response, thermal sensor 130 is disabled and enters a shutdown state.

Thermal Sensor Shutdown Exit

At the point thermal sensor 130 is shut down, a timer is started by controller timer 138. The timer value is compared to two register values a Maximum Thermal Sensor Shutdown Time (MAXTSST) and a Minimum Thermal Sensor Shutdown Time (MINTSST). The Minimum Thermal Sensor Shutdown Time (MINTSST) value is used to ensure that thermal sensor 130 is not turned on too early, to avoid circuit related concerns. This is because, thermal sensor 130 should not be turned off and turned on in too quick of a time as many analog circuits, for example the analog components of thermal sensor 130 should not be disabled and re-enabled until a predetermined time period has elapsed. In various embodiments, the Minimum Thermal Sensor Shutdown Time (MINNTSST) is preconfigured or predetermined in software. Until the minimum thermal shutdown time has elapsed, thermal sensor controller 132 will not re-enable thermal sensor 130.

Accordingly, in a particular embodiment, an equation for determining whether the thermal sensor minimum shutdown timer has expired is as follows: Thermal_Sensor_Shutdown_Timer>=MINTSST, where Thermal_Sensor_Shutdown_Timer is the current value of the timer signal generated by controller timer 138 and MINTSST is the aforedescribed Minimum Thermal Sensor Shutdown Time.

The Maximum Thermal Sensor Shutdown Time (MAXTSST) is a predetermined time period used to ensure that thermal sensor 130 is enabled periodically so that the latest temperature can be measured by thermal sensor 130 during long periods of idleness. The maximum thermal sensor shutdown timer helps ensure that the stored temperature value (TEMP.TSR) 218 stays in synchronization with the die temperature of PCH device 104. In various embodiments the Maximum Thermal Sensor Shutdown Time (MAXTSST) value may be set to a fairly high value to allow for greater power savings. In a particular embodiment, the Maximum Thermal Sensor Shutdown Time (MAXTSST) value is set to sixteen (16) seconds. Accordingly, after every periodic elapsing of the Maximum Thermal Sensor Shutdown Time regardless of current conditions, thermal sensor controller 132 will wake up thermal sensor 130, receive the latest temperature from thermal sensor 130, store the latest temperature value, and may return thermal sensor 130 back to sleep if conditions allow.

In accordance with at least one embodiment, any one of the following conditions will cause thermal sensor controller 132 to enable thermal sensor 130:

1) CPU 102 exits a non-C0 (if the non-C0 mode is enabled, which is a typical case).

2) Maximum Thermal Sensor Shutdown Timer expires.

3) Dynamic Thermal Sensor Shutdown in S0 idle Enable is cleared.

Regarding condition 1), thermal sensor controller 132 is configured to enable thermal sensor 130 whenever CPU 102 exits a non-C0 state such as if CPU 102 enters an active state in which one or more CPU cores 110 are executing code. Alternatively, if thermal sensor controller 132 is configured such that dynamic shutdown of thermal sensor 130 is allowed even in a CPU C0 state, this condition is ignored. Regarding condition 2), thermal sensor controller 132 is configured to enable thermal sensor 130 when the maximum thermal shutdown timer has expired as described above. Regarding condition 3), thermal sensor controller 132 is configured to enable thermal sensor 130 on the condition that the Dynamic Thermal Sensor Shutdown in S0 Idle enablement bit is cleared, such as through software or a Basic Input/Output System (BIOS).

Figure 3:
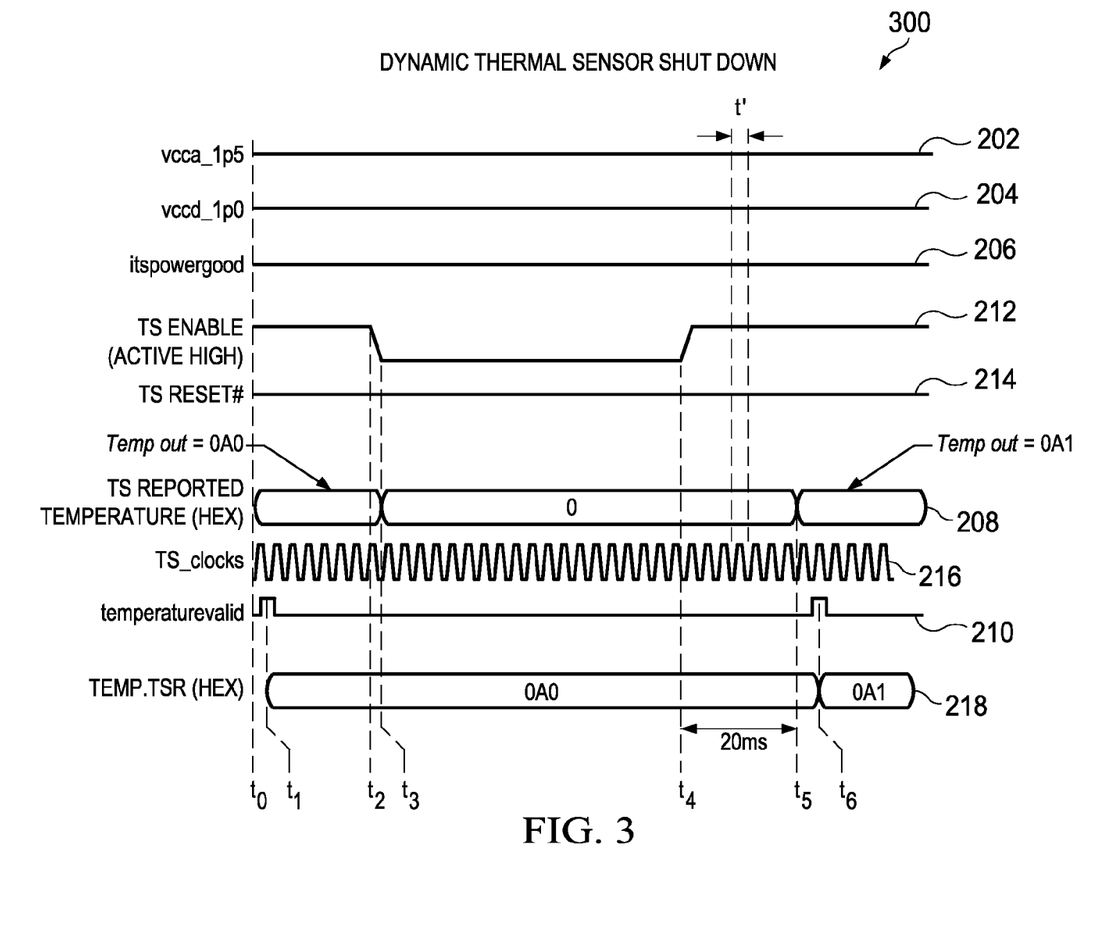
FIG. 3 is a simplified timing diagram illustrating dynamic thermal sensor shutdown according to one embodiment.

Referring now to FIG. 3, FIG. 3 is a simplified timing diagram 300 illustrating dynamic thermal sensor shutdown according to one embodiment. Timing diagram 300 includes first supply rail signal (VCCA_1p5) 202, second supply rail signal (VCCD_1p0) 204, power good signal (itspowergood) 206, thermal sensor enable signal (TS enable) 212, thermal sensor reset signal (TS reset#) 214, reported temperature output value (TS reported temperature) 208, temperature sensor clock signal (TS_clocks) 216, temperature valid signal (temperaturevalid) 210, and stored temperature value (TEMP.TSR) 218. In the illustrated embodiment, first supply rail signal (VCCA_1p5) 202 and second supply rail signal (VCCD_1p0) 204 are maintained at constant value so that portions of thermal sensor 130 remain powered at all times. In addition, power good signal (itspowergood) 206 is maintained at a "good" status value since the power rails are maintained at a constant full value. Thermal sensor reset signal (TS reset#) 214 is a reset signal for thermal sensor 130. Because the values of first supply rail signal (VCCA_1p5) 202 and second supply rail signal (VCCD_1p0) 204 are not changed in the illustrated embodiment, it is not necessary to reset thermal sensor 130. Accordingly, it is not necessary to change the value of thermal sensor reset signal (TS reset#) 214 in the illustrated embodiment. Thermal sensor clock (TS_clocks) 216 is a periodic clock signal generated by thermal sensor 130 having a period t' that remains unchanged during operation.

At time $t_0$, thermal sensor enable signal (TS enable) 212 is at an active high level indicating that thermal sensor 130 is enabled. Also at this time, reported temperature output value (TS reported temperature) 208 from thermal sensor 130 has a digital hex value of "0A0" representative of a particular temperature associated with PCH device 104. At time $t_1$, thermal sensor controller 132 receives temperature valid signal (temperaturevalid) 210. In response, thermal sensor controller 132 stores the digital hex value of "0A0" within temperature register 134 as stored temperature value (TEMP.TSR) 218.

At time $t_2$, thermal sensor controller 132 starts transitioning thermal sensor enable signal (TS enable) 212 to a low value indicating that thermal sensor 130 is to be disabled as a result of the aforedescribed conditions for dynamic thermal sensor shutdown being satisfied. At time $t_4$, thermal sensor enable signal (TS enable) 212 has reached the low value. At this time, portions of thermal sensor 130 have been disabled and reported temperature output value (TS reported temperature) 208 is no longer valid. During this time thermal sensor 130 reports a default value of "0". However, because thermal sensor controller 132 has stored the previous valid value from thermal sensor 130 within thermal register 132, the value of the temperature associated with PCH device 103 reported to any requesting software during this time period will be reported as the stored value rather than the invalid value currently being reported by thermal sensor 130. Accordingly, when thermal sensor controller 132 receives a request for the temperature associated with PCH device 104 from a requestor, thermal sensor controller 132 provides the stored value of the temperature output value to the requestor.

At time t4, thermal sensor controller 132 starts transitioning thermal sensor enable signal (TS enable) 212 to a high value indicating that thermal sensor 130 is to be re-enabled as a result of the aforedescribed conditions for dynamic thermal sensor exit or wakeup being satisfied. During wakeup of thermal sensor 130, a wakeup period extending from time $t_4$ to time $t_5$ elapses before a valid reported temperature output value (TS reported temperature) 208 is reported by thermal sensor 130. In a particular embodiment, the time period between from time $t_4$ to time $t_5$ is approximately twenty (20) milliseconds (ms). At time $t_5$, thermal sensor 130 reports a new reported temperature output value (TS reported temperature) 208 having a hex value of "0A1". At time $t_6$, thermal sensor controller 132 receives temperature valid signal (temperaturevalid) 210 and in response thermal sensor controller 132 stores the digital hex value of "0A1" within temperature register 134 as stored temperature value 218.

Figure 4:
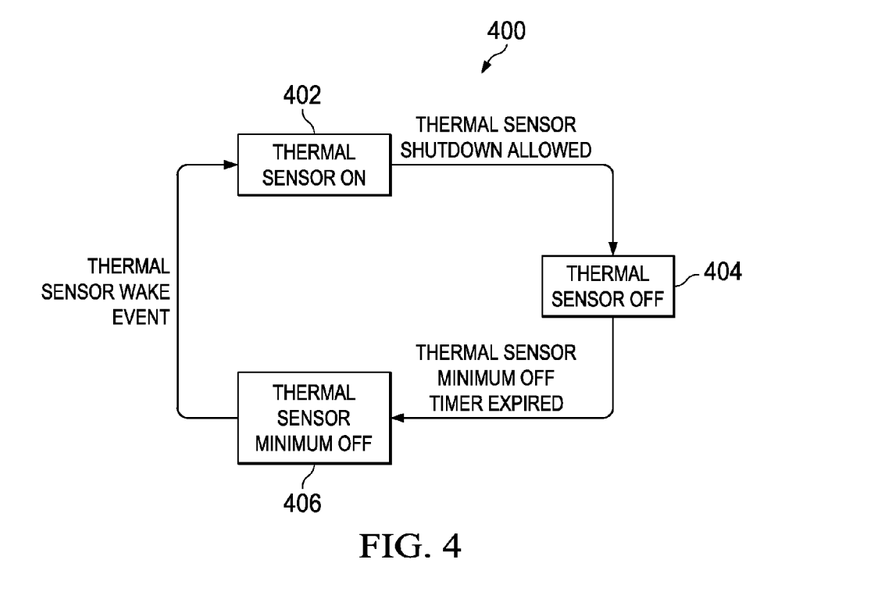
FIG. 4 is a simplified state machine diagram illustrating potential operations associated with the thermal sensor controller.

Referring now to FIG. 4, FIG. 4 is a simplified state machine diagram 400 illustrating potential operations associated with thermal sensor controller 132. In a thermal sensor ON state 402 thermal sensor 130 is in an enabled state as a result of thermal sensor controller 132 setting thermal sensor enable signal (TS enable) 212 to a high value. In this state, thermal sensor 130 is enabled and providing reported temperature output value 208 to thermal sensor controller 132. When dynamic thermal shutdown is allowed as result of the conditions necessary for dynamic shutdown of thermal sensor 130 being satisfied within computer system 100, thermal sensor controller 132 transitions from thermal sensor ON state 402 to a thermal sensor OFF state 404. In a particular embodiment, example conditions necessary for dynamic thermal sensor shutdown include CPU 102 being in a non-C0 state or the "Dynamic Thermal Sensor Shutdown in C0 Allowed" configuration bit being set, and the current PCH temperature being less than or equal to the low temperature threshold value.

During, thermal sensor OFF state 404, thermal sensor controller 132 sets thermal sensor enable signal (TS enable) 212 to a low value. As a result, thermal sensor 130 is disabled. Thermal sensor controller 132 then transitions to a thermal sensor minimum off state 406. Thermal sensor minimum off state 406 ensures that the thermal sensor controller 132 keeps thermal sensor 130 off for a time equal to at least the thermal sensor minimum off timer has expired. Upon the occurrence of a thermal sensor wake event such as CPU 102 exiting a non-C0 state or if the maximum thermal sensor shutdown timer expires, thermal sensor controller 132 transitions again to thermal sensor ON state 402.

Figure 5:
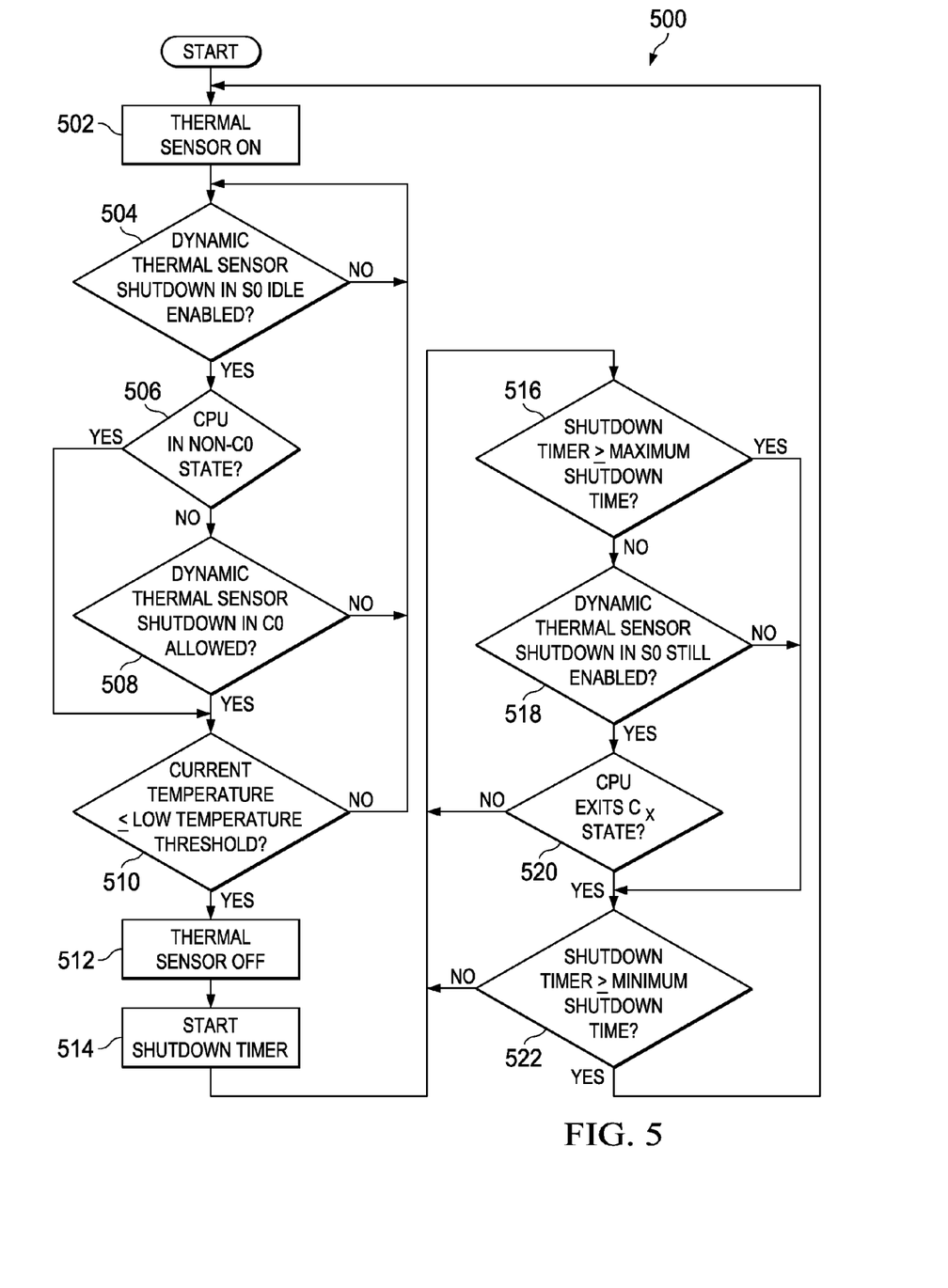
FIG. 5 is a simplified flowchart illustrating potential operations associated with the thermal sensor controller according to one embodiment.

Referring now to FIG. 5, FIG. 5 is a simplified flowchart 500 illustrating potential operations associated with thermal sensor controller 132 according to one embodiment. In 502, thermal sensor controller 132 turns thermal sensor 130 on by setting thermal sensor enable signal (TS enable) 212 to a high value. In 504, thermal sensor controller 132 determines whether dynamic thermal sensor shutdown in S0 idle has been enabled. As previously discussed, enablement of dynamic thermal sensor shutdown in S0 idle may be configured by setting a configuration bit. If dynamic thermal sensor shutdown in S0 idle has not been enabled, the operations remain in 504. If dynamic thermal sensor shutdown in S0 has been enabled, operations continue to 506. In 506, thermal sensor controller 132 determines whether CPU 102 is in a non-C0 state. In at least one embodiment, the non-C0 state is a non-active state of CPU 102. In a particular embodiment, the non-active state is an idle state. If CPU 102 is in not in a non-C0 state, the operations continue to 508 in which thermal sensor controller 132 determines whether dynamic thermal sensor shutdown in C0 is allowed. As previously discussed, enablement of dynamic thermal sensor shutdown in C0 may be configured by setting a configuration bit. If thermal sensor controller 132 determines that dynamic thermal sensor shutdown in C0 is not allowed, the operations return to 504.

If thermal sensor controller 132 determines in 506 that CPU 102 is in a non-C0 state or if thermal sensor controller 132 determines in 508 that dynamic thermal sensor shutdown in C0 is allowed, the operations continue to 510. In 510, thermal sensor controller 132 determines whether the current temperature as reported by thermal sensor 130 and stored in temperature register 134 is less than or equal to the preconfigured (or predetermined) low temperature threshold value. If the current temperature is not less than or equal to the low temperature threshold value the operations return to 504. If the current temperature is less than or equal to the low temperature threshold value, the operations continue to 512, In 512, thermal sensor controller 132 turns thermal sensor 130 off by setting thermal sensor enable signal (TS enable) 212 to a low value.

In 514, thermal sensor controller 132 starts the shutdown timer provided by controller timer 138. In 516, thermal sensor controller 132 determines whether the shutdown timer value is greater than or equal to the maximum shutdown time. If the shutdown timer value is not greater than or equal to the maximum thermal sensor shutdown time, the operations continue to 518. In 518, thermal sensor controller 132 determines whether dynamic thermal sensor shutdown in S0 is still enabled. If dynamic thermal sensor shutdown in S0 is still enabled, the operations continue to 520. In 520, thermal sensor controller 132 determines whether CPU 102 has exited a Cx state. If CPU 102 has not exited the Cx state, the operations return to 516. However, if it is determined in 516 that the shutdown timer is greater than or equal to the maximum shutdown time, if it is determined in 518 that dynamic thermal sensor shutdown is S0 is not still enabled, or it is determined in 520 that CPU 102 has exited a Cx state such as C0, the operations continue to 522.

In 522, thermal sensor controller 132 determines whether the shutdown timer is greater than or equal to the minimum shutdown timer value. If it is determined that the shutdown timer is not greater than or equal to the minimum shutdown timer value, the operations return to 516. However, if the shutdown timer is greater than or equal to the minimum shutdown time value, the operations return to 502 in which thermal sensor controller 132 re-enables temperature sensor 130.

Thermal Sensor Power Management Register

In various embodiments, a thermal sensor power management register (TPSM) is used to configure various aspect of the operation of thermal sensor controller 132. In particular embodiments, the TPSM may be configured within a BIOS of computer system 100. In still other embodiments, the TPSM may be configured by other suitable software.

A particular embodiment of bit allocation for the TSPM register is as follows:

| Bit | Access & Default | Description |
|---|---|---|
| 15 | R/W/L | Thermal Sensor Power Management Lock (TSPMLOCK): Setting this bit to a 1 causes the rest of the bits in this register to be locked. |
| 14 | R/W | Dynamic Thermal Sensor Shutdown in S0 idle Enable (DTSSS0EN): 1: Dynamic thermal sensor shutdown in S0 idle is enabled. When set to 1, the power management logic shuts down the thermal sensor when the CPU is in a C-state and TEMP.TSR <= Low Temp Threshold. 0: Dynamic thermal sensor shutdown in S0 idle is disabled |
| 13 | RW 0 h | Dynamic Thermal Sensor Shutdown in C0 Allowed (DTSSIC0) 0: CPU must be in a non-C0 state to allow PCH thermal sensor shutdown 1: CPU can be in a C0 or non-C0 state to allow PCH thermal sensor shutdown. |
| 12 | RW 0 h | Minimum Thermal Sensor Shutdown Time (MINTSST) - sets the minimum time that the thermal sensor will be held in a shutdown state even if a wake condition is asserted. 0: 25 us 1: 1 us (pre-si validation mode - reserved test mode) |
| 11:9 | RW 0 h | Maximum Thermal Sensor Shutdown Time (MAXTSST) - sets the maximum time that the thermal sensor will be held in a shutdown state assuming no other wake conditions. This register is used to set the expiration time of the timer that is used to wake up the thermal sensor on expiration. 000: 1 s 001: 2 s 010: 4 s 011: 8 s 100: 16 s 101-111: Reserved |
| 8:0 | RW 0 h | Low Temp Threshold (LTT) - Sets the low maximum temp value used for dynamic thermal sensor shutdown consideration. This register is not lockable, so that SW can change the values during runtime. |

A particular exemplary equation for thermal sensor 130 to be shutdown by thermal sensor controller 132 is as follows:

Thermal sensor shutdown allowed=TS_dyn_shutdown_enable AND (current_temp[8:0]<=low_threshold_temp[8:0]) AND (TS_temp_valid) AND (EA==0OR TS_dyn_shutdown_in_C0)

Where:

TS_dyn_shutdown_enable=dynamic thermal sensor shutdown in S0 idle being enabled such as indicated in TSPM bit 14.

TS_dyn_shutdown_in_C0=dynamic thermal sensor shutdown in C0 being allow as indicated in TSPM bit 13.

Current_temp[8:0]=TEMP.TSR value stored in temperature register 134

Low_threshold_temp[8:0]=low temperature threshold value

EA=execution allowed bit from a performance monitoring counter (PMC) (0=in Cx state, 1=in C0)

TS_temp_valid=at least one temperature valid signal (temperaturevalid) 208 pulse from the thermal sensor 130 has been received since the thermal sensor 130 was enabled.

The TS_temp_valid flag is necessary in the case that temp sensor 130 is being re-enabled due to any wake event. After the temp sensor is up, it should not be shut down immediately due to a current_temp<low_threshold_temp comparison which is done using the TEMP.TSR bits. The TEMP.TSR register value is maintained while the temp sensor 130 is shut down and updated only after subsequent temperarturevalid pulses are received.

A particular exemplary equation for thermal sensor 130 to be re-enabled by thermal sensor controller 132 is as follows:

Thermal Sensor Wake Event=!TS_dyn_shutdown_enable OR ((EA==1) AND (DTSSIC0=0) OR Thermal_Sensor_Maximum_Shutdown_Timer_Expired Where:

DTSSIC0=Shutdown in C0 allowed.

Thermal_Sensor_Maximum_Shutdown_Timer_Expired=expiration of the thermal sensor maximum shutdown timer.

In one implementation, thermal sensor controller 132 is includes hardware and/or software to achieve (or to foster) the dynamic thermal sensor shutdown operations, as outlined herein in this Specification. In other embodiments, certain operations may be executed externally to thermal sensor controller 132, or included in some other component to achieve this intended functionality. Alternatively, thermal sensor controller 132 may include hardware or software that can coordinate with other components in order to achieve the operations, as outlined herein. In still other embodiments, one or several devices may include any suitable algorithms, hardware, software, components, modules, interfaces, or objects that facilitate the operations thereof.

Although various embodiments are described as thermal sensor 130 and thermal sensor 132 being associated with measuring temperature associated with PCH device 104, it should be understood that in other embodiments, thermal sensor 130 and thermal sensor 132 may be used to measure temperature associated with any other electronic component, integrated circuit, microchip die, or any other device. In addition, although various embodiments are described as using an active status of CPU 102 for use in determining whether thermal sensor 130 should be enabled, it should be understood that in other embodiments any other processor may be used.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such.

In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

EXAMPLE EMBODIMENT IMPLEMENTATIONS

One particular example implementation may include a system, such as a computing system, that includes a processor operable to execute instructions associated with the electronic code, a thermal sensor operable to measure a temperature associated with a device, and a controller in communication with the thermal sensor. The controller is configured to receive an activity status associated with the processor, and receiving a temperature output value representative of a measured temperature associated with the device from the thermal sensor. The controller is further configured to provide a disable signal to the thermal sensor based upon the activity status indicating that the processor is in a reduced activity state and that the temperature output value is less than or equal to a predetermined temperature threshold value.

What is claimed is:

1. A system, comprising:
    a processor operable to execute instructions associated with electronic code;
    a thermal sensor operable to measure a temperature associated with a device; and
    a controller in communication with the thermal sensor, the controller configured to:
        determine whether a system power state of the system is in a non-active state, the system power state indicative of an overall power consumption of the system;
        receive an activity status associated with the processor, wherein the system power state is separate and distinct from the activity status associated with the processor;
        receive a temperature output value representative of a measured temperature associated with the device from the thermal sensor; and
        provide a disable signal to the thermal sensor based upon a determination that the system power state of the system is in the non-active state, the activity status indicating that the processor is in a reduced activity state, and that the temperature output value is less than or equal to a predetermined temperature threshold value.

2. The system of claim 1, wherein the controller is further configured to store the temperature output value.

3. The system of claim 2, wherein the controller is further configured to:
    receive a request for the temperature output value from a requestor; and
    provide the stored temperature output value to the requestor.

4. The system of claim 1, wherein the non-active state comprises an idle state.

5. The system of claim 1, wherein the controller is further configured to provide an enable signal to the thermal sensor based upon the activity status indicating that the processor is in an active state.

6. The system of claim 1, wherein the controller is further configured to provide an enable signal to the thermal sensor based upon an elapsing of a predetermined time period.

7. The system of claim 1, wherein the device includes a platform controller hub (PCH).

8. The system of claim 1, wherein the processor includes a central processing unit (CPU).

9. The system of claim 1, wherein the activity status is received from logic that is not the processor.

10. An apparatus, comprising:
    logic configured to:
        determine whether a system power state of a system is in a non-active state, the system power state indicative of an overall power consumption of the system;
        receive an activity status associated with a processor of the system, wherein the system power state is separate and distinct from the activity status associated with the processor;
        receive a temperature output value representative of a measured temperature associated with a device by a thermal sensor; and
        provide a disable signal to the thermal sensor based upon a determination that the system power state of the system is in the non-active state, the activity status indicating that the processor is in a reduced activity state, and that the temperature output value is less than or equal to a predetermined temperature threshold value.

11. The apparatus of claim 10, wherein the logic is further configured to store the temperature output value.

12. The apparatus of claim 10, wherein the logic is further configured to:
    receive a request for the temperature output value from a requestor; and
    provide the stored temperature output value to the requestor.

13. The apparatus of claim 10, wherein the logic is further configured to provide an enable signal to the thermal sensor based upon the activity status indicating that the processor is in an active state.

14. The apparatus of claim 10, wherein the logic is further configured to provide an enable signal to the thermal sensor based upon an elapsing of a predetermined time period.

15. A method, comprising:
    determining whether a system power state of a system is in a non-active state, the system power state indicative of an overall power consumption of the system;
    receiving an activity status associated with a processor of the system, wherein the system power state is separate and distinct from the activity status associated with the processor;

receiving a temperature output value representative of a measured temperature associated with a device by a thermal sensor; and providing a disable signal to the thermal sensor based upon a determination that the system power state of the system is in the non-active state, the activity status indicating that the processor is in a reduced activity state, and that the temperature output value is less than or equal to a predetermined temperature threshold value.

16. The method of claim 15, further comprising storing the temperature output value.

17. The method of claim 15, further comprising providing an enable signal to the thermal sensor based upon the activity status indicating that the processor is in an active state.

18. A device, comprising:
a thermal sensor operable to measure a temperature associated with the device; and
a controller in communication with the thermal sensor, the controller configured to:
   determine whether a system power state of a system is in a non-active state, the system power state indicative of an overall power consumption of the system;
   receive an activity status associated with a processor of the system, wherein the system power state is separate and distinct from the activity status associated with the processor;
   receive a temperature output value representative of a measured temperature associated with the device from the thermal sensor; and
   provide a disable signal to the thermal sensor based upon a determination that the system is in the non-active state, the activity status indicating that the processor is in a reduced activity state, and that the temperature output value is less than or equal to a predetermined temperature threshold value.

19. The device of claim 18, wherein the controller is further configured to store the temperature output value.

20. The device of claim 19, wherein the controller is further configured to:
receive a request for the temperature output value from a requestor; and
provide the stored temperature output value to the requestor.

21. The device of claim 18, wherein the controller is further configured to provide an enable signal to the thermal sensor based upon the activity status indicating that the processor is in an active state.

22. The device of claim 18, wherein the controller is further configured to provide an enable signal to the thermal sensor based upon an elapsing of a predetermined time period.

* * * * *